Nov. 3, 1925.  1,560,175
G. HANSON ET AL
PISTON
Filed Dec. 20, 1924
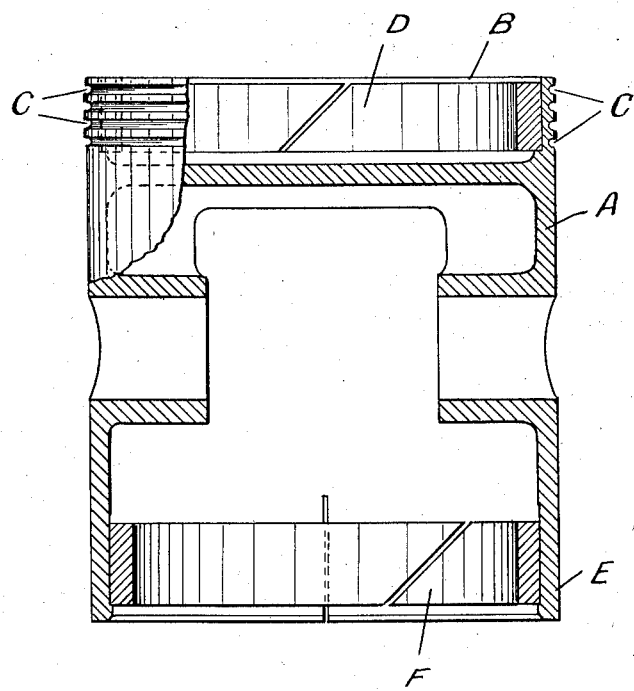
INVENTOR
GLEN HANSON
HENRY G. HANSON
BY
ATTORNEY Patented Nov. 3, 1925.

1,560,175

UNITED STATES PATENT OFFICE.

GLEN HANSON AND HENRY G. HANSON, OF MINNEAPOLIS, MINNESOTA.

PISTON.

Application filed December 20, 1924. Serial No. 757,293.

*To all whom it may concern:*

Be it known that we, GLEN HANSON and HENRY G. HANSON, citizens of the United States, residing at Minneapolis, in the county of Hennepin and State of Minnesota, have invented certain new and useful Improvements in Pistons, of which the following is a specification.

This invention relates to improvements in pistons for internal combustion and other engines, and the main object is to provide a novel, efficient, and practical construction of piston in which the necessity for piston rings is eliminated and which is so constructed that its upper and lower ends will be self sealing and tight with respect to the cylinder in which the piston reciprocates. Further and more specific objects will be disclosed in the course of the following specification, reference being had to the accompanying drawing, in which:

The figure is a substantially diametrical sectional elevation of the piston.

Referring to the drawing by reference characters A designates the body of the piston, which may be used in any type of conventional internal combustion or steam engine. The upper end of the piston is provided with a relative thin annular flange B having an outer periphery which is slightly larger than the circumference of the piston proper, so that the flange will fit tightly, and snugly against the cylinder, and thus prevent the so-called pumping of oil into the combustion chamber above the piston. For the same reason and to insure proper lubrication, the flange is provided with a series of annular oil grooves C. Arranged against the inner side or circumference of the flange B is a heavy split expansion ring D, which exerts a pressure outwardly against the flange and thus combines with the force of the explosion and the resulting heat to expand the flange tightly against the cylinder wall of the engine.

The lower end or skirt E of the piston is also provided with an expansion ring F, and the skirt has one (or more) kerf or slit G to permit it to be expanded against the cylinder wall by the expansion ring.

It is understood that various modifications may be made in the general design and structural details of the invention as herein illustrated and described, providing, however, that such modifications come within the spirit and scope of the appended claims.

Having now, therefore, fully shown and described our invention what we claim to be new and desire to protect by Letters Patent is:—

1. A piston having an annular flange extending from its upper end, and a compression ring arranged within the flange, said flange having a series of oil grooves in its outer periphery.

2. A piston of the character described, an annular flange extending integrally from one end of the piston and spring means for creating an expansion pressure against the flange, said flange having annular grooves in its periphery.

In testimony whereof we affix our signatures.

GLEN HANSON.
HENRY G. HANSON.